(12) United States Patent
Yang

(10) Patent No.: US 12,008,215 B2
(45) Date of Patent: Jun. 11, 2024

(54) IMAGE DISPLAY METHOD AND TERMINAL

(71) Applicant: VIVO MOBILE COMMUNICATION CO., LTD., Guangdong (CN)

(72) Inventor: Qihao Yang, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 0 days.

(21) Appl. No.: 17/555,023

(22) Filed: Dec. 17, 2021

(65) Prior Publication Data
US 2022/0107721 A1   Apr. 7, 2022

Related U.S. Application Data

(63) Continuation of application No. PCT/CN2020/092009, filed on May 25, 2020.

(30) Foreign Application Priority Data

Jun. 28, 2019  (CN) .......................... 201910576894.1

(51) Int. Cl.
*G06F 3/0482* (2013.01)
*G06F 3/04817* (2022.01)

(52) U.S. Cl.
CPC ........ *G06F 3/0482* (2013.01); *G06F 3/04817* (2013.01); *G06F 2203/04805* (2013.01)

(58) Field of Classification Search
CPC ............... G06F 3/0481; G06F 3/04812; G06F 3/04817; G06F 3/0482; G06F 3/0487–04883; G06F 16/168; G06F 16/287; G06F 16/44–447; G06F 16/54; G06F 16/64; G06F 16/74–745; G06F 16/904; G06F 2203/04805; G06F 2203/04806; G06F 3/03–033; G06F 3/03547; G06F 3/041–047;
(Continued)

(56) References Cited

U.S. PATENT DOCUMENTS

2006/0132455 A1* 6/2006 Rimas-Ribikauskas ..................... G06F 3/0488 345/173
2006/0250419 A1   11/2006 Shiba et al.
(Continued)

FOREIGN PATENT DOCUMENTS

CN   1855217 A   11/2006
CN   101267468 A   9/2008
(Continued)

OTHER PUBLICATIONS

Zhang Jin-Zeng et al., Research on Mobile Web Search, Journal of Software, Jan. 2012, vol. 23, No. 1, p. 46-64.
(Continued)

*Primary Examiner* — Asher D Kells
(74) *Attorney, Agent, or Firm* — IP & T GROUP LLP

(57) ABSTRACT

An image display method includes: in a case that at least two thumbnails are displayed on a first screen of the terminal, receiving a first input performed by a user for a target area; selecting a target thumbnail from the at least two thumbnails in response to the first input; and displaying a magnified image corresponding to the target thumbnail. The target area is an area different from display areas of the at least two thumbnails.

11 Claims, 16 Drawing Sheets

(58) Field of Classification Search
CPC ..... G06F 2203/0336; G06F 2203/0338; G06F 2203/0339; G06F 2203/041–04102; G06F 2203/04104–04114; G06F 1/169–1692; H04N 1/00442; H04N 2201/325; G05B 2219/23163; G05B 2219/35072; G05B 2219/35334

See application file for complete search history.

(56) References Cited

U.S. PATENT DOCUMENTS

| | | | |
|---|---|---|---|
| 2007/0277126 A1* | 11/2007 | Park | G06F 3/04883 715/866 |
| 2008/0227503 A1 | 9/2008 | Cheon et al. | |
| 2009/0164567 A1 | 6/2009 | Hara | |
| 2009/0267907 A1* | 10/2009 | Noma | G06F 3/0488 345/173 |
| 2009/0282332 A1* | 11/2009 | Porat | G06F 3/04883 715/702 |
| 2010/0020048 A1* | 1/2010 | Narita | G06F 3/04886 345/204 |
| 2010/0331052 A1* | 12/2010 | Watanabe | H04M 1/0235 455/566 |
| 2012/0030566 A1* | 2/2012 | Victor | G06F 3/0488 715/702 |
| 2012/0033933 A1 | 2/2012 | Suzuki | |
| 2013/0100036 A1* | 4/2013 | Papakipos | G06F 3/0485 345/173 |
| 2013/0239063 A1* | 9/2013 | Ubillos | G06F 3/0485 715/838 |
| 2014/0181740 A1* | 6/2014 | Gachoka | G06F 3/04842 715/802 |
| 2014/0331187 A1* | 11/2014 | Hicks | G06F 3/04842 715/845 |
| 2015/0074606 A1* | 3/2015 | Melen | G06F 3/0488 715/835 |
| 2015/0074615 A1 | 3/2015 | Han et al. | |
| 2015/0077362 A1 | 3/2015 | Seo | |
| 2015/0189056 A1* | 7/2015 | Magi | H04W 68/00 455/566 |
| 2016/0196043 A1* | 7/2016 | Kim | G06F 3/0481 715/845 |
| 2017/0083229 A1* | 3/2017 | Luo | G06F 3/0482 |
| 2019/0114050 A1* | 4/2019 | Takahashi | G06F 3/04886 |
| 2020/0150832 A1* | 5/2020 | Winn | A61K 39/39566 |
| 2020/0341623 A1 | 10/2020 | Yin | |
| 2021/0200329 A1 | 7/2021 | Zhang | |

FOREIGN PATENT DOCUMENTS

| | | |
|---|---|---|
| CN | 101464882 A | 6/2009 |
| CN | 102077580 A | 5/2011 |
| CN | 103019591 A | 4/2013 |
| CN | 103744577 A | 4/2014 |
| CN | 105094647 A | 11/2015 |
| CN | 105681648 A | 6/2016 |
| CN | 106055247 A | 10/2016 |
| CN | 106791118 A | 5/2017 |
| CN | 108156318 A | 6/2018 |
| CN | 108469898 A | 8/2018 |
| CN | 108563383 A | 9/2018 |
| CN | 108769374 A | 11/2018 |
| CN | 109635143 A | 4/2019 |
| CN | 109739589 A | 5/2019 |
| CN | 109840060 A | 6/2019 |
| CN | 109847335 A | 6/2019 |
| CN | 110321449 A | 10/2019 |
| EP | 1835386 A2 | 9/2007 |
| WO | 2019/072149 A1 | 4/2019 |

OTHER PUBLICATIONS

Design of mobile phone image page browser based on Android platform, Information & Communications, 2014, vol. 8, Sum. No. 140, p. 77-78.

Office Action issued by the Chinese Patent Office dated Feb. 2, 2021.

Office Action issued by the Chinese Patent Office dated Apr. 16, 2021.

International Search Report and Written Opinion issued by the Chinese Patent Office dated Jul. 29, 2020.

Extended European Search Report on the European Patent Application No. 20831506.9 issued by the European Patent Office on Jul. 19, 2022.

* cited by examiner

IMAGE DISPLAY METHOD AND TERMINAL

CROSS REFERENCE TO RELATED APPLICATIONS

This application claims is a Bypass Continuation Application of PCT/CN2020/092009 filed on May 25, 2020, which claims priority to Chinese Patent Application No. 201910576894.1 filed on Jun. 28, 2019, which are incorporated herein by reference in their entirety.

TECHNICAL FIELD

The present disclosure relates to the field of communications technologies, and in particular, to an image display method and a terminal.

BACKGROUND

As photograph functions of terminals are becoming more powerful, users take photos more and more frequently by using the terminals, and a quantity of images stored in the terminals is also increasing. Currently, to view an image in an album, a user usually needs to tap a thumbnail of the image to magnify the thumbnail for viewing. However, in an operation process, it is difficult for the user to avoid blocking an image display area. As a result, the user can not clearly and completely browse display content in the whole image display area, which affects a visual effect of the user.

SUMMARY

Embodiments of the present disclosure provide an image display method and a terminal.

According to a first aspect, an embodiment of the present disclosure provides an image display method, applied to a terminal and including:
- in a case that at least two thumbnails are displayed on a first screen of the terminal, receiving a first input performed by a user for a target area;
- selecting a target thumbnail from the at least two thumbnails in response to the first input; and
- displaying a magnified image corresponding to the target thumbnail, where
- the target area is an area different from display areas of the at least two thumbnails.

According to a second aspect, an embodiment of the present disclosure provides a terminal, including:
- a first receiving module, configured to: in a case that at least two thumbnails are displayed on a first screen of the terminal, receive a first input performed by a user for a target area;
- a selection module, configured to select a target thumbnail from the at least two thumbnails in response to the first input; and
- a display module, configured to display a magnified image corresponding to the target thumbnail, where
- the target area is an area different from display areas of the at least two thumbnails.

According to a third aspect, an embodiment of the present disclosure provides a terminal, including: a memory, a processor, and a computer program that is stored in the memory and executable on the processor, where when the computer program is executed by the processor, the steps of the image display method provided in the first aspect of the embodiments of the present disclosure are implemented.

According to a fourth aspect, an embodiment of the present disclosure provides a non-transitory computer-readable storage medium, where the non-transitory computer-readable storage medium stores a computer program, and when the computer program is executed by a processor, the steps of the image display method provided in the first aspect of the embodiments of the present disclosure are implemented.

DESCRIPTION OF EMBODIMENTS

The technical solutions in the embodiments of the present disclosure are described below clearly with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure shall fall within the protection scope of the present disclosure.

The term "include" and any other variants in the specification and claims of this application mean to cover the non-exclusive inclusion, for example, a process, method, system, product, or device that includes a list of steps or units is not necessarily limited to those steps or units, but may include other steps or units not expressly listed or inherent to such a process, method, product, or device. In addition, "and/or" used in the specification and claims means at least one of the connected objects. For example, A and/or B represents the following three cases: Only A exists, only B exists, and both A and B exist.

In the embodiments of the present disclosure, the word such as "example" or "for example" is used to represent giving an example, an illustration, or a description. Any embodiment or design scheme described as "exemplary" or "for example" in the embodiments of the present disclosure should not be construed as being more preferred or advantageous than other embodiments or design schemes. To be precise, the use of the term such as "exemplary" or "for example" is intended to present a related concept in a specific manner.

Figure 1:
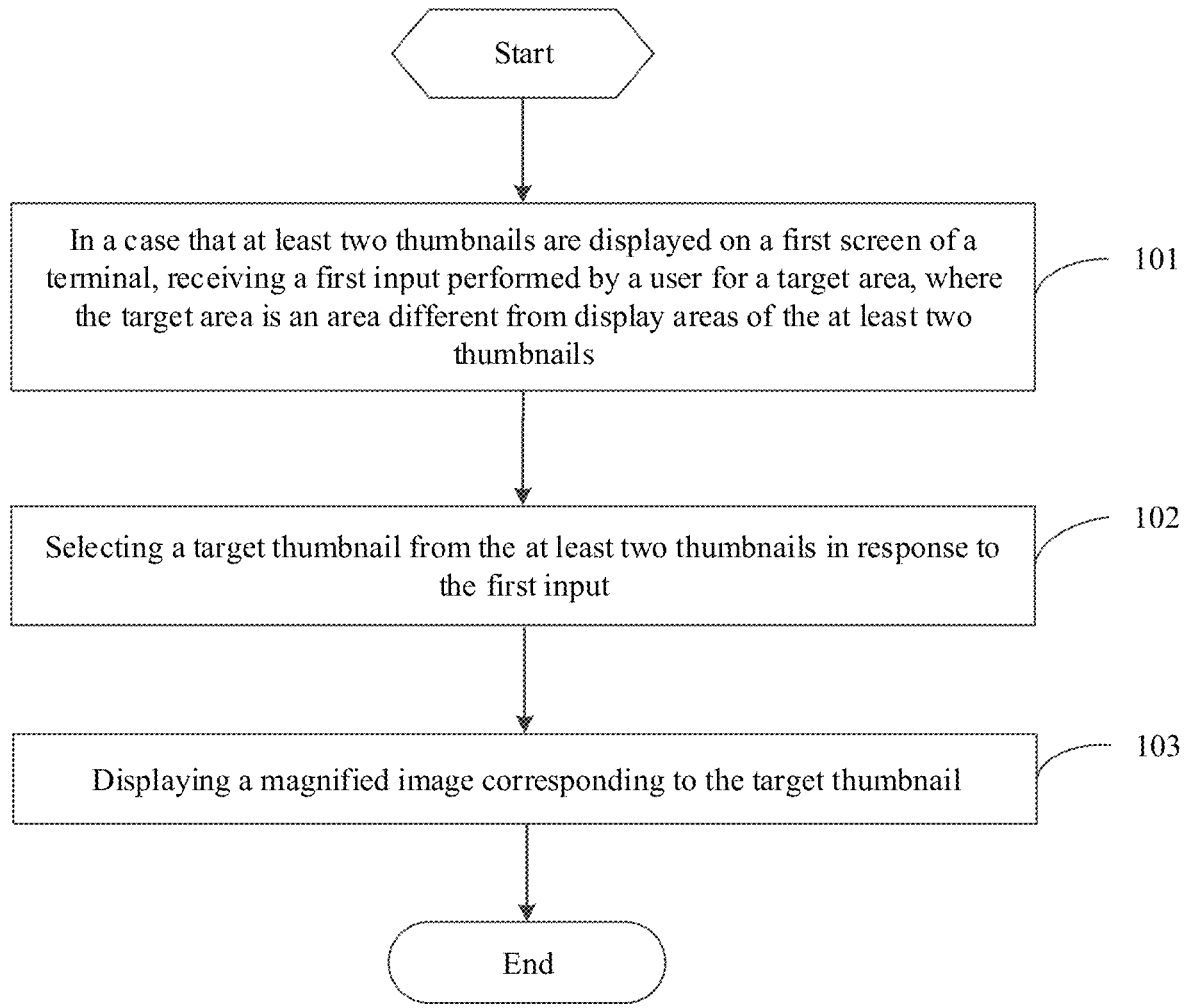
FIG. 1 is a flowchart of an image display method according to an embodiment of the present disclosure.

FIG. 1 is a flowchart of an image display method according to an embodiment of the present disclosure. As shown in FIG. 1, the image display method is applied to a terminal. The method includes the following steps.

Step 101: In a case that at least two thumbnails are displayed on a first screen of the terminal, receive a first input performed by a user for a target area, where the target area is an area different from display areas of the at least two thumbnails.

Figure 2:
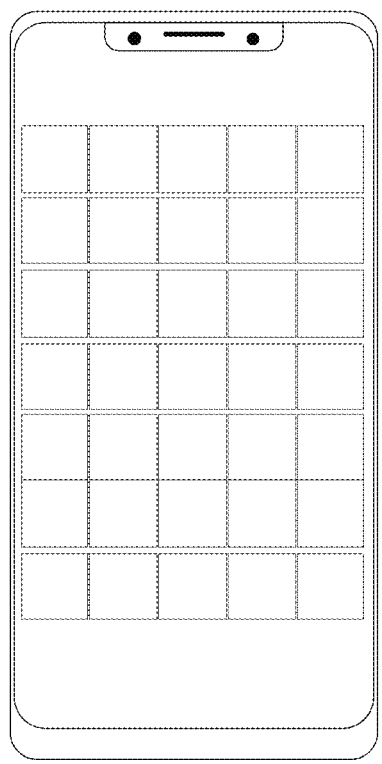
FIG. 2 is a schematic diagram of a thumbnail display interface according to an embodiment of the present disclosure.

That at least two thumbnails are displayed on a first screen of the terminal may be understood as that the terminal is in a thumbnail browsing mode of an album, as shown in FIG. 2.

The target area is an area different from a thumbnail display area, that is, the target area is an area different from an image display area, for example, may be a fingerprint recognition area (for example, a fingerprint recognition area disposed on a front side of the terminal, or a fingerprint recognition area disposed on a rear side of the terminal), or may be a touch button area. In a case that the terminal includes a second screen, the target area may alternatively be located in the second screen.

In this embodiment of the present disclosure, when the terminal is in an image display scenario (for example, the foregoing thumbnail display scenario), the target area is endowed with an image operation attribute, that is, the target area may be temporarily used as an image operation area. However, when the terminal is in other scenarios, the target area is no longer used as the image operation area. For example, assuming that the target area is a fingerprint recognition area, when the terminal is in the image display scenario, the fingerprint recognition area is endowed with the image operation attribute, and an original attribute (for example, a fingerprint recognition attribute) of the fingerprint recognition area is no longer embodied. However, when the terminal is in a lock-screen scenario, the target area is no longer used as the image operation area but is used as the original fingerprint recognition area.

The area different from the image display area is used as the image operation area, so that in an operation process, a hand of the user does not block the image display area. In this way, in the operation process, the user can clearly and completely browse display content in the whole image display area, which improves a visual effect of the user in the operation process.

The first input performed for the target area may be a single-tap operation, a double-tap operation, a touch and hold operation, a slide operation, a gesture operation with a specific trajectory, or the like.

Step 102: Select a target thumbnail from the at least two thumbnails in response to the first input.

Figure 3:
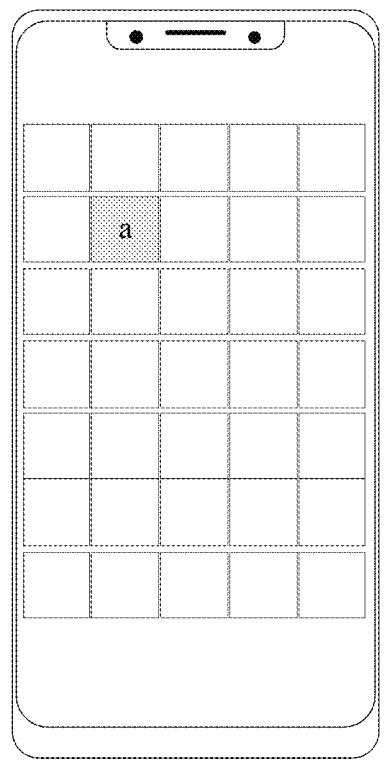
FIG. 3 is a schematic diagram of selection of a target thumbnail according to an embodiment of the present disclosure.

In this step, after receiving the first input performed by the user for the target area, the terminal may determine and select the target thumbnail from a plurality of thumbnails. In this embodiment of the present disclosure, a method of changing a color of the target thumbnail, highlighting the target thumbnail, adding a selection identifier to the target thumbnail (for example, displaying a check mark identifier on the target thumbnail), or the like may be used to indicate that the target thumbnail is in a selected state, so that the selected target thumbnail is easier to recognize. As shown in FIG. 3, a thumbnail a is the selected target thumbnail.

There may be one target thumbnail or a plurality of target thumbnails.

The target thumbnail may be a thumbnail that conforms to a preset rule. For example, the target thumbnail may be a first thumbnail in an album or a thumbnail at a preset display location; the target thumbnail may be a thumbnail having a preset image feature (for example, a thumbnail having a face feature that matches a preset face feature); or target thumbnails may be M thumbnails that are in the album and whose image similarities are greater than a threshold, where M is an integer greater than 1.

The target thumbnail may alternatively be a target thumbnail determined based on an input feature of the first input. For example, when the first input is a touch and hold operation, it is determined that the target thumbnail is a first thumbnail in the album or a thumbnail at a preset display location; when the first input is a slide operation, it is determined that the target thumbnail is a thumbnail having a preset image feature; and when the first input is a gesture operation with a specific trajectory (for example, an S-shaped trajectory or a circle trajectory), it is determined that target thumbnails are M thumbnails that are in the album and whose image similarities are greater than a threshold.

Step 103: Display a magnified image corresponding to the target thumbnail.

In this step, after the target thumbnail is selected, the terminal may display the magnified image corresponding to the target thumbnail, and an area where the magnified image is displayed may be the first screen.

It should be noted that, when the target thumbnails are the M thumbnails that are in the album and whose image similarities are greater than the threshold, all magnified images of the M thumbnails that are similar may be displayed.

Generally, mobile terminals such as mobile phones and tablet computers in the related art can display a magnified image of only one image, and a user can view a magnified image of only one image at a time. When the user needs to view and compare several images, the user needs to switch between the images for multiple times. As a result, this operation is relatively inconvenient.

In the foregoing method, the mobile terminal can display magnified images of a plurality of (including two) images at a time, so that the mobile terminal can implement a function of displaying a plurality of magnified images, thereby improving flexibility and convenience of the mobile terminal for image display. In this way, the user can conveniently view and compare similar images without switching between the images repeatedly.

In this embodiment, a plurality of methods of displaying the magnified image corresponding to the target thumbnail may be included. For example, the magnified image corresponding to the target thumbnail may be displayed with a fixed size. When the magnified image is displayed, a thumbnail in the album is invisible or covered by the magnified image; or the magnified image corresponding to the target thumbnail may be displayed in a form of a floating window. For a method of displaying the magnified image in the form of the floating window, see details about step 103 as follows.

The floating window is displayed at a target location corresponding to the target thumbnail, where the magnified image corresponding to the target thumbnail is displayed in the floating window.

Figure 4:
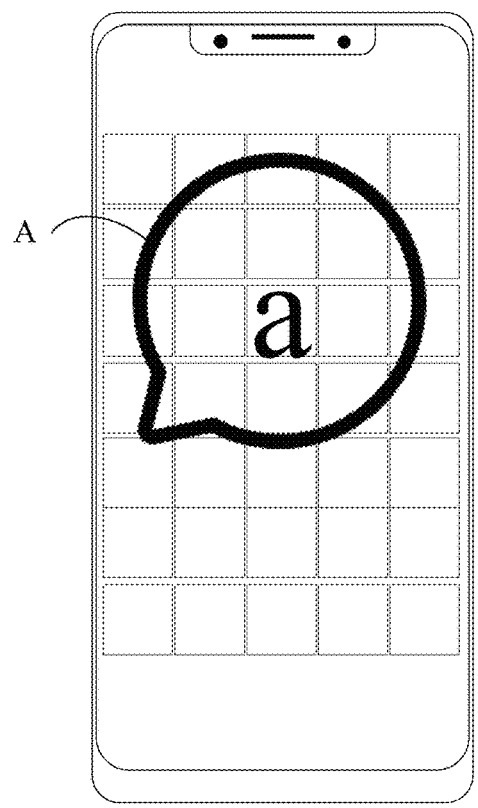
FIG. 4 is a first schematic display diagram of a magnified image according to an embodiment of the present disclosure.

As shown in FIG. 4, a magnified image of a thumbnail a is displayed in a floating window. The floating window may float over an interface of the thumbnail in the album. A display location of the floating window (namely, the target location corresponding to the target thumbnail) may be in or adjacent to an area where the target thumbnail is located. Because the magnified image of the target thumbnail is displayed in the floating window, it is unnecessary that the target thumbnail is still displayed. Therefore, the floating window may cover the target thumbnail, but a thumbnail at a corresponding location may still be displayed in an area different from an area of the floating window.

In this embodiment of the present disclosure, a shape of the floating window may not be limited. The floating window may be a square floating window, a circular floating window, or a bubble-shaped floating window A shown in FIG. 4.

Figure 5:
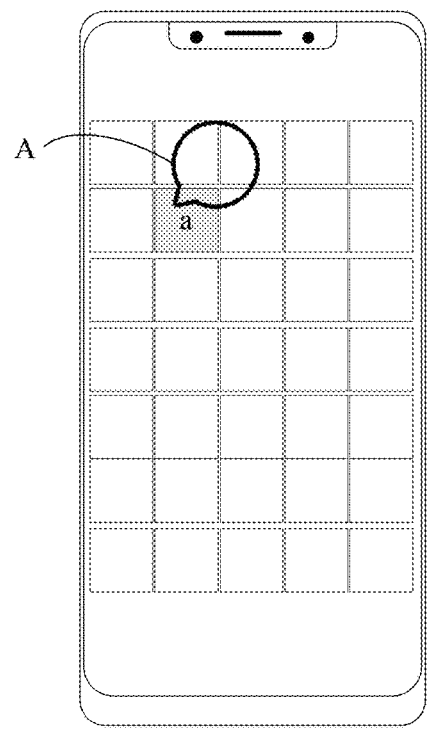
FIG. 5 is a second schematic display diagram of a magnified image according to an embodiment of the present disclosure.

It should be noted that, to make it more convenient for the user to view the magnified image of the target thumbnail, a size of the floating window may be adjusted and the floating window may be movable. When the size of the floating window is adjusted, a magnified image displayed in the floating window is adaptively adjusted accordingly. When the floating window is moved, the magnified image displayed in the floating window is also moved accordingly. Therefore, in step 103, a size of a floating window that is initially displayed may be relatively small. When the floating window is initially displayed, the floating window may be displayed on a periphery of the target thumbnail, as shown in FIG. 5. When the user inputs a minifying or magnifying operation (for example, a stretch operation or a double-tap operation) or a move operation (for example, a drag operation) for the floating window or the magnified image in the floating window, the floating window and the magnified image in the floating window are minified, magnified, or moved accordingly. Therefore, the magnified image in this embodiment of the present disclosure may be understood as an image that can be magnified, but is not limited to being magnified at the beginning, or being magnified from the start to the end.

In this embodiment of the present disclosure, a user's operation is received for an area different from an image display area, so that a thumbnail can be selected, and a magnified image of the selected thumbnail can be displayed. In this way, in a case that the user needs to view a magnified image of an image, the user does not need to perform related operations for the image display area. Therefore, in an operation process, the user can clearly and completely browse display content in the whole image display area, which improves a visual effect of the user in the operation process.

Optionally, the selecting a target thumbnail from the at least two thumbnails includes:

obtaining a currently selected first thumbnail from the at least two thumbnails; and selecting, from the at least two thumbnails, N thumbnails whose location relationships with the first thumbnail are a first location relationship as the target thumbnail, where N is a positive integer.

This optional implementation provides a method of selecting the target thumbnail from the thumbnails. In this method, the currently selected thumbnail is the first thumbnail, and the first thumbnail may be already selected before the first input is received. The first thumbnail may be used as a reference thumbnail for selecting the target thumbnail. After receiving the first input, the terminal may select the N thumbnails whose location relationships with the first thumbnail are the first location relationship as the target thumbnail.

The first thumbnail may alternatively be displayed as a magnified image. For example, the first thumbnail may be already displayed as the magnified image before the terminal receives the first input, and may still be displayed as the magnified image after the terminal receives the first input; or the first thumbnail may be displayed as a thumbnail before the terminal receives the first input and displayed as the magnified image after the terminal receives the first input.

Optionally, before the selecting, from the at least two thumbnails, N thumbnails whose location relationships with the first thumbnail are a first location relationship as the target thumbnail, the method further includes:

obtaining a first input feature of the first input; and determining a quantity N of target thumbnails based on the first input feature.

This optional implementation provides a method of determining the quantity of target thumbnails. In this method, the quantity of the target thumbnails, namely, a value of N, is determined based on the first input feature of the first input.

The first input feature of the first input may be input duration of the first input or input strength of the first input. In a case that the quantity of target thumbnails is determined based on the input duration, the input duration may be in direct proportion to the quantity of target thumbnails. The longer the input duration, the more target thumbnails. In a case that the quantity of target thumbnails is determined based on the input strength, the input strength may be in direct proportion to the quantity of target thumbnails. The greater the input strength, the more target thumbnails.

Optionally, before the selecting, from the at least two thumbnails, N thumbnails whose location relationships with the first thumbnail are a first location relationship as the target thumbnail, the method further includes:

obtaining a second input feature of the first input; and determining a first location relationship associated with the second input feature, where the first location relationship includes at least one of the following:

being at a same location as the first thumbnail;

being on a first side of the first thumbnail;

being adjacent to the first thumbnail; or being spaced from the first thumbnail by M thumbnails, where M is a positive integer.

It should be noted that, when the first location relationship is being spaced from the first thumbnail by M thumbnails, N thumbnails that are spaced from the first thumbnail by M thumbnails may be selected at an equal interval or at unequal intervals according to a sequence of numbers.

This optional implementation provides a method of determining a location relationship (namely, the first location relationship) between the target thumbnail and the first thumbnail. In this method, the first location relationship is determined based on the second input feature of the first input.

The second input feature of the first input may be an input type or input trajectory. For example, different input types may be associated with different first location relationships, and different input trajectories may alternatively be associated with different first location relationships.

The following describes the image display method in this embodiment of the present disclosure with reference to examples.

Example 1: The first input is a slide-up and slide-down operation. For example, the first input is an operation of quickly sliding up and then quickly sliding down in a fingerprint recognition area on a rear side. The target thumbnail is the currently selected first thumbnail.

Figure 6A:
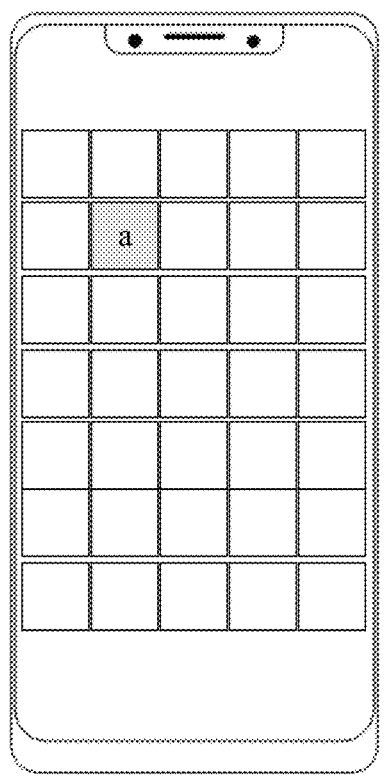
FIG. 6A is a first schematic diagram of an operation of displaying a magnified image of a currently selected thumbnail as a target thumbnail according to an embodiment of the present disclosure.
Figure 6B:
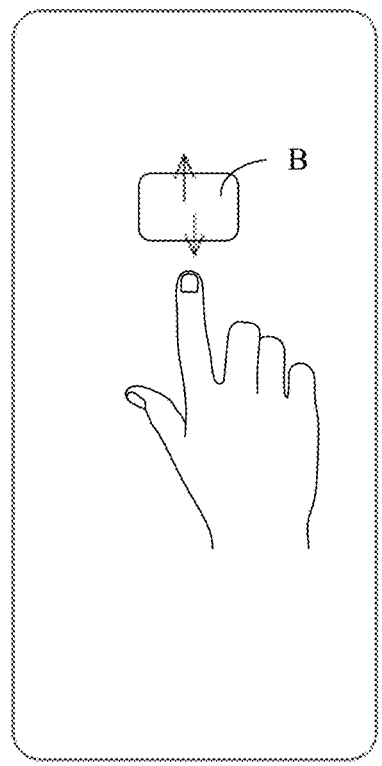
FIG. 6B is a second schematic diagram of an operation of displaying a magnified image of a currently selected thumbnail as a target thumbnail according to an embodiment of the present disclosure.
Figure 6C:
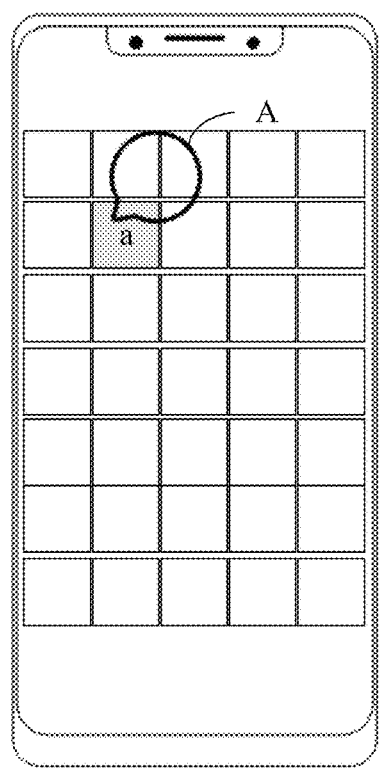
FIG. 6C is a third schematic diagram of an operation of displaying a magnified image of a currently selected thumbnail as a target thumbnail according to an embodiment of the present disclosure.

In this example, the first location relationship is being at a same location as the first thumbnail, where N is 1. In FIG. 6A, before the terminal receives the first input, a first thumbnail a in the album is already selected; in FIG. 6B, the terminal receives the first input in a fingerprint recognition area B on the rear side, the first input herein is an operation of quickly sliding up and quickly sliding down, and the terminal obtains the currently selected first thumbnail a in response to the first input, and selects a thumbnail at a same location as the first thumbnail a as the target thumbnail (namely, the first thumbnail a itself); and in FIG. 6C, the terminal displays a floating window on one side of the first thumbnail a, and displays a magnified image corresponding to the first thumbnail a in the floating window.

It should be noted that, for brevity of description, the first example and subsequent examples all use the fingerprint recognition area B on the rear side as the target area and use the bubble-shaped floating window A as a form of the floating window for description.

Example 2: The first input is a circle and slide-up operation. For example, the first input is an operation of circling for the fingerprint recognition area on the rear side and then sliding up to an edge of the fingerprint recognition area on the rear side. The target thumbnail is a thumbnail adjacent to the currently selected first thumbnail, for example, a thumbnail located on the right side of the currently selected first thumbnail.

Figure 7A:
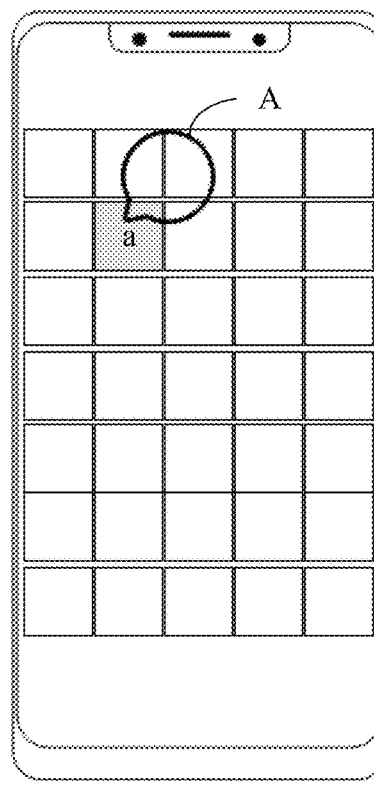
FIG. 7A is a first schematic diagram of an operation of displaying a magnified image of an added single target thumbnail according to an embodiment of the present disclosure.
Figure 7B:
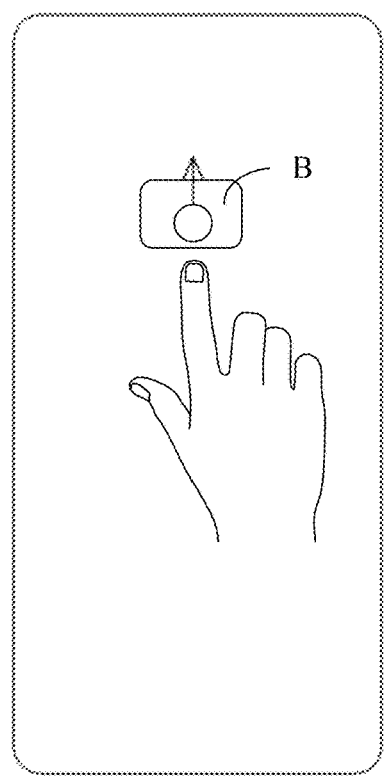
FIG. 7B is a second schematic diagram of an operation of displaying a magnified image of an added single target thumbnail according to an embodiment of the present disclosure.
Figure 7C:
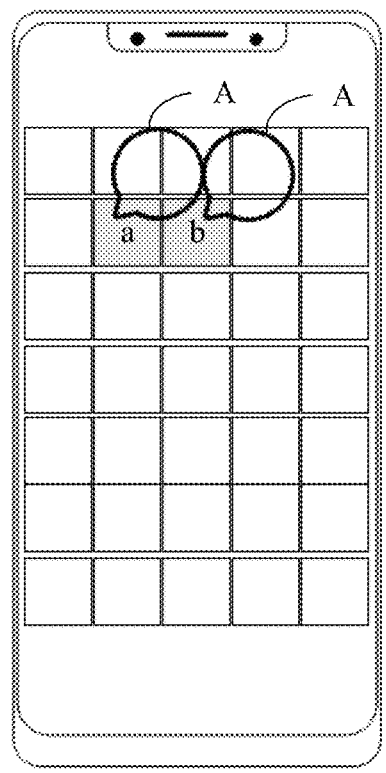
FIG. 7C is a third schematic diagram of an operation of displaying a magnified image of an added single target thumbnail according to an embodiment of the present disclosure.
Figure 7D:
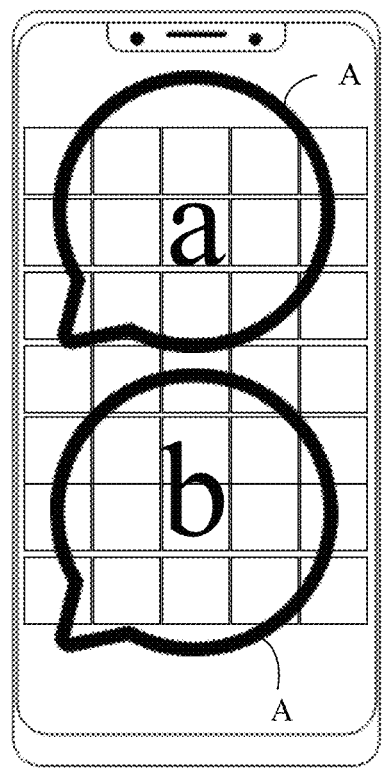
FIG. 7D is a fourth schematic diagram of an operation of displaying a magnified image of an added single target thumbnail according to an embodiment of the present disclosure.

In this example, the first location relationship is being adjacent to the first thumbnail or located on the right side of the first thumbnail, where N is 1. In FIG. 7A, before the terminal receives the first input, a first thumbnail a in the album is already selected, and a magnified image of the first thumbnail a is displayed; in FIG. 7B, the terminal receives the first input for the fingerprint recognition area B on the rear side, and the first input herein is an operation of circling and then quickly sliding up; in FIG. 7C, the terminal obtains the currently selected first thumbnail a in response to the first input, and selects a thumbnail b adjacent to the first thumbnail a as the target thumbnail; and in FIG. 7D, the terminal displays both magnified images corresponding to the thumbnails a and b.

Example 3: The first input is a circle and slide-right operation. For example, the first input is an operation of circling for the fingerprint recognition area on the rear side and then sliding right to an edge of the fingerprint recognition area on the rear side. The quantity of target thumbnails is determined based on duration of the sliding right.

Figure 8A:
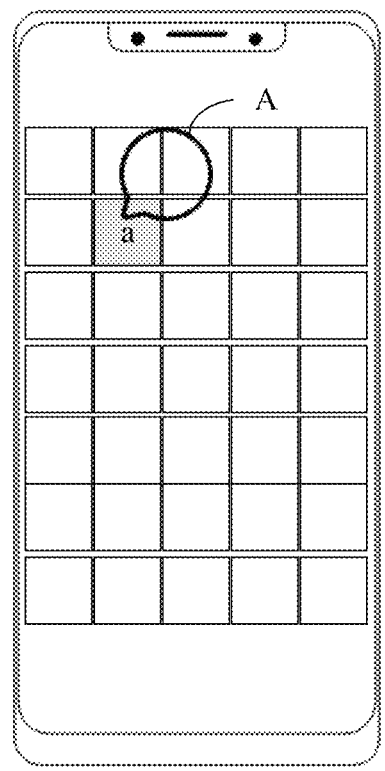
FIG. 8A is a first schematic diagram of an operation of displaying magnified images of a plurality of added target thumbnails according to an embodiment of the present disclosure.
Figure 8B:
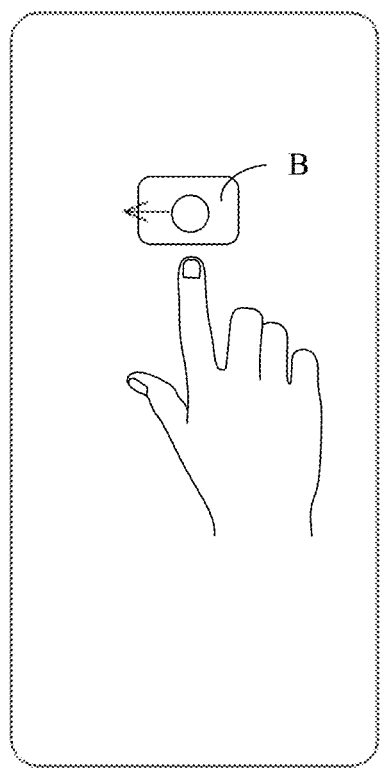
FIG. 8B is a second schematic diagram of an operation of displaying magnified images of a plurality of added target thumbnails according to an embodiment of the present disclosure.

In FIG. 8A, before the terminal receives the first input, a first thumbnail a in the album is already selected, and a magnified image of the first thumbnail a is displayed; in FIG.

Figure 8C:
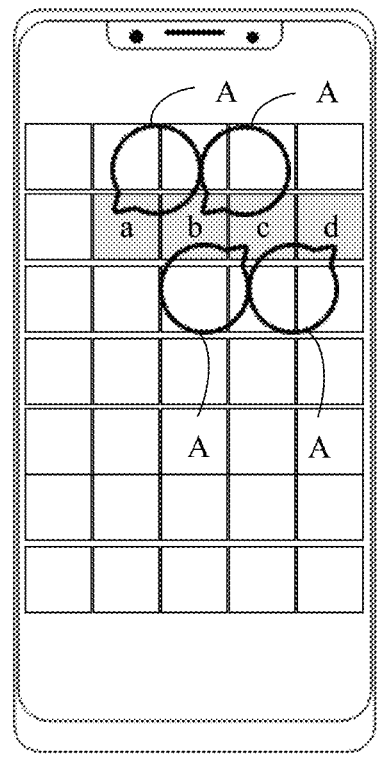
FIG. 8C is a third schematic diagram of an operation of displaying magnified images of a plurality of added target thumbnails according to an embodiment of the present disclosure.
Figure 8D:
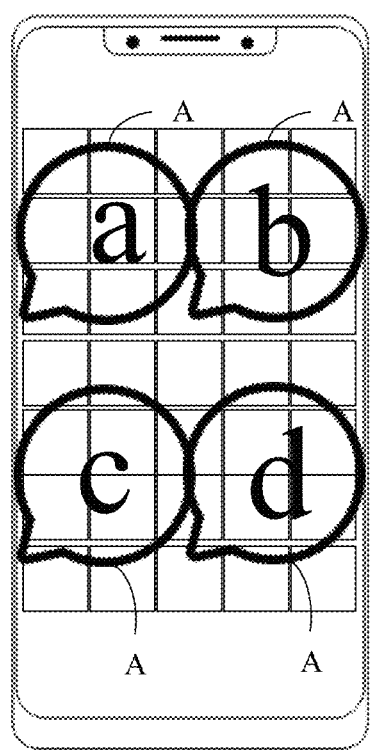
FIG. 8D is a fourth schematic diagram of an operation of displaying magnified images of a plurality of added target thumbnails according to an embodiment of the present disclosure.

8B, the terminal receives the first input for the fingerprint recognition area B on the rear side, the first input herein is an operation of circling and sliding right, duration of the sliding right is used to determine the quantity of target thumbnails, and the longer the duration of the sliding right, the more target thumbnails; in FIG. 8C, the terminal obtains the currently selected first thumbnail a in response to the first input, and selects three thumbnails b, c, and d that are adjacent to the first thumbnail a as the target thumbnail; and in FIG. 8D, the terminal displays all magnified images corresponding to the thumbnails a, b, c, and d. In this example, N is 3.

In many cases, the user may take a plurality of images of a same object at a same shooting location. These images with greater similarities are usually arranged in the album of the terminal in a concentrated manner. In view of this, when the quantity N of target thumbnails is greater than 1, the terminal may use N images that are adjacently arranged as the target thumbnails, so that the user can view or compare the plurality of similar images at a time.

Based on the foregoing implementations, the target thumbnail that needs to be magnified can be quickly and conveniently selected, so that an image display manner is more flexible.

Optionally, before the first input is received, a currently selected thumbnail is a second thumbnail, and a magnified image of the second thumbnail is displayed on the first screen.

After the receiving a first input performed by a user for a target area, the method further includes:
canceling the selection of the second thumbnail, and canceling the display of the magnified image of the second thumbnail.

This implementation provides a method of replacing a thumbnail that is selected and whose magnified image is displayed. In this method, after the terminal receives the first input, the second thumbnail whose magnified image is displayed may be replaced with the target thumbnail.

The first input may be a slide operation in a single direction. For example, the first input is a slide operation in a single direction, for example, a slide-left operation, a slide-right operation, a slide-up operation, or a slide-down operation, input for the fingerprint recognition area on the rear side.

For example, when the first input is a slide-left operation, the target thumbnail may be an image located on the left side of the second thumbnail; when the first input is a slide-right operation, the target thumbnail may be an image located on the right side of the second thumbnail; when the first input is a slide-up operation, the target thumbnail may be an image located above the second thumbnail; and when the first input is a slide-down operation, the target thumbnail may be an image located below the second thumbnail.

Figure 9A:
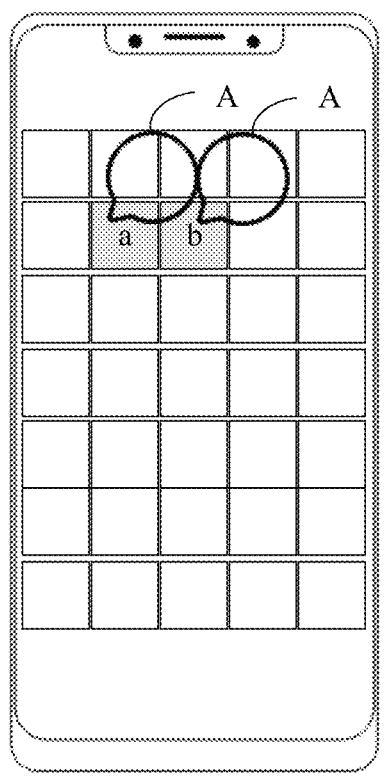
FIG. 9A is a first schematic diagram of an operation of replacing a displayed magnified image according to an embodiment of the present disclosure.
Figure 9B:
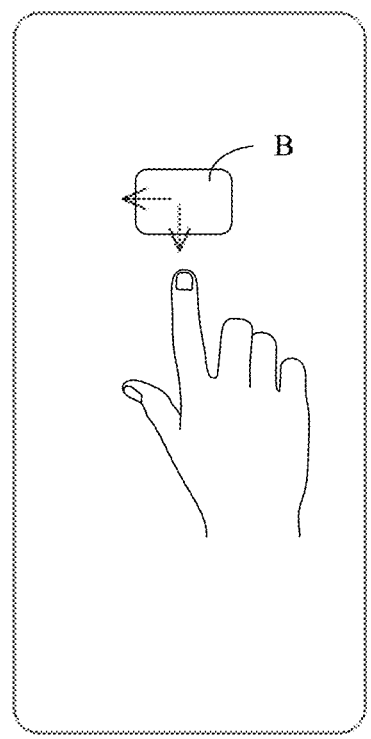
FIG. 9B is a second schematic diagram of an operation of replacing a displayed magnified image according to an embodiment of the present disclosure.
Figure 9C:
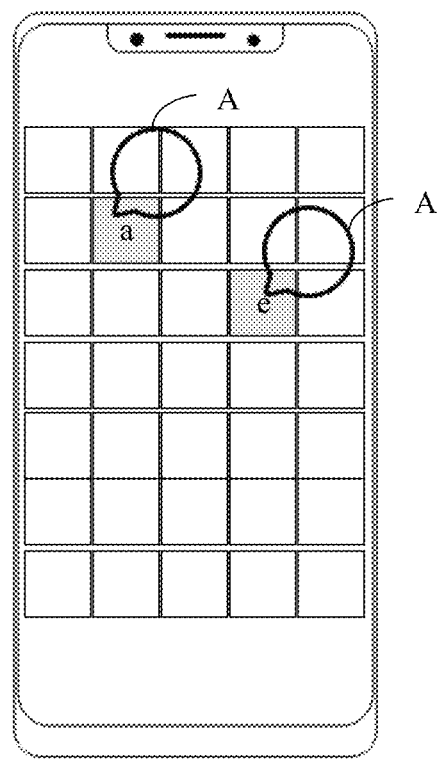
FIG. 9C is a third schematic diagram of an operation of replacing a displayed magnified image according to an embodiment of the present disclosure.
Figure 9D:
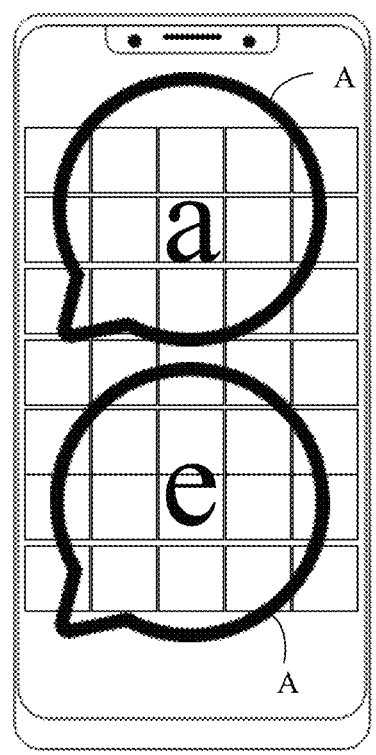
FIG. 9D is a fourth schematic diagram of an operation of replacing a displayed magnified image according to an embodiment of the present disclosure.

In FIG. 9A, before the terminal receives the first input, a first thumbnail a and a second thumbnail b in the album are already selected, and both magnified images of the first thumbnail a and the second thumbnail b are displayed; and in FIG. 9B, the terminal receives the first input for the fingerprint recognition area B on the rear side, and the first input herein is a slide-down operation plus a slide-right operation. In FIG. 9C, in one aspect, the terminal selects a thumbnail e as the target thumbnail in response to the first input, and displays a magnified image of the thumbnail e; and in another aspect, the terminal cancels the selection of the thumbnail b, and cancels the display of the magnified image of the thumbnail b. In FIG. 9D, after the first input is ended, the terminal displays both magnified images corresponding to the thumbnails a and e.

Based on the foregoing implementation, a displayed magnified image can be quickly and conveniently replaced, so that an image display manner is more flexible.

Optionally, the target thumbnail includes K thumbnails, and K is an integer greater than or equal to 1.

After the displaying a magnified image corresponding to the target thumbnail, the method further includes:
receiving a second input performed by the user for the target area;
obtaining a third input feature of the second input;
determining T thumbnails of the K thumbnails based on the third input feature; and
canceling the selection of the T thumbnails, and canceling display of magnified images of the T thumbnails, where T is a positive integer, and T≤K.

This implementation provides a method of canceling display of a magnified image. In this method, the terminal receives the second input performed by the user for the target area and determines, based on the third input feature of the second input, a magnified image to be canceled, cancels the selection of the thumbnail corresponding to the magnified image to be canceled, and cancels the display of the magnified image to be canceled.

The third input feature of the second input may be an input type or input trajectory, input duration, or input strength; may be a combination of the input type or input trajectory and the input duration; or may be a combination of the input type or input trajectory and the input strength.

In this embodiment, the terminal may determine, based on an input type or input trajectory of the second input, whether to cancel a single magnified image, or a plurality of magnified images or all magnified images at a time. In a method of canceling a plurality of magnified images, the terminal may determine, based on input duration of the second input, a quantity of magnified images to be canceled. The following describes the foregoing implementations with reference to examples.

Example 1: The second input is a circle and slide-down operation. For example, the second input is an operation of circling for the fingerprint recognition area on the rear side and then sliding down to an edge of the fingerprint recognition area on the rear side. Selection of a thumbnail of the target thumbnails is canceled, and display of a magnified image of the thumbnail is canceled.

Figure 10A:
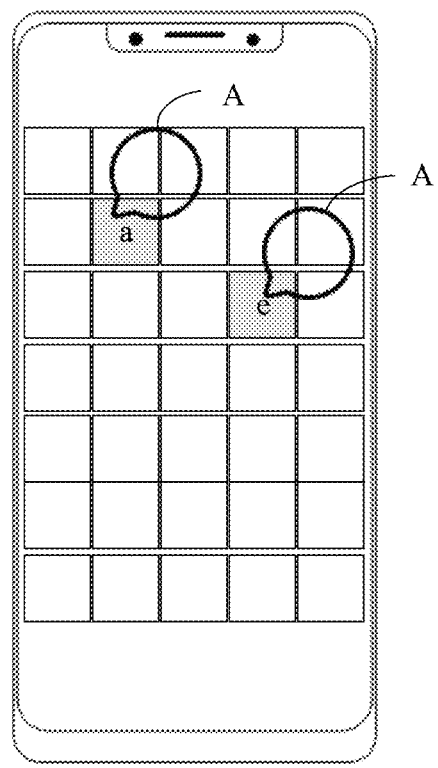
FIG. 10A is a first schematic diagram of an operation of reducing display of a magnified image of a single target thumbnail according to an embodiment of the present disclosure.
Figure 10B:
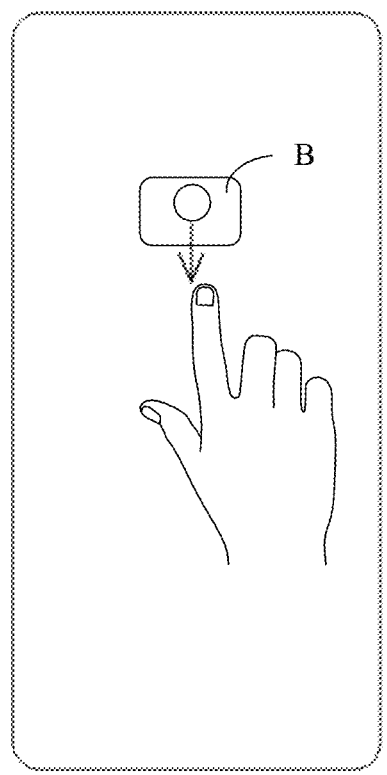
FIG. 10B is a second schematic diagram of an operation of reducing display of a magnified image of a single target thumbnail according to an embodiment of the present disclosure.
Figure 10C:
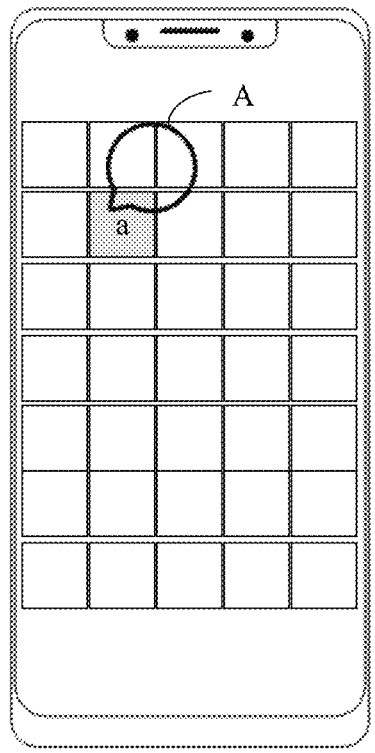
FIG. 10C is a third schematic diagram of an operation of reducing display of a magnified image of a single target thumbnail according to an embodiment of the present disclosure.

In this example, T is 1. In FIG. 10A, before the terminal receives the second input, target thumbnails a and e are already selected, and magnified images of the target thumbnails a and e are displayed; in FIG. 10B, the terminal receives the second input for the fingerprint recognition area B on the rear side, and the second input herein is an operation of circling and quickly sliding down; and in FIG. 10C, the terminal cancels the selection of the target thumbnail e in response to the second input, and cancels the display of the magnified image of the thumbnail e.

Example 2: The second input is a circle and slide-left operation. For example, the second input is an operation of circling for the fingerprint recognition area on the rear side and then sliding left to an edge of the fingerprint recognition area on the rear side. Selection of a plurality of thumbnails of the target thumbnails is canceled, display of magnified images of the plurality of thumbnails is canceled, and a quantity of the magnified images to be canceled is determined based on duration of the sliding left.

Figure 11A:
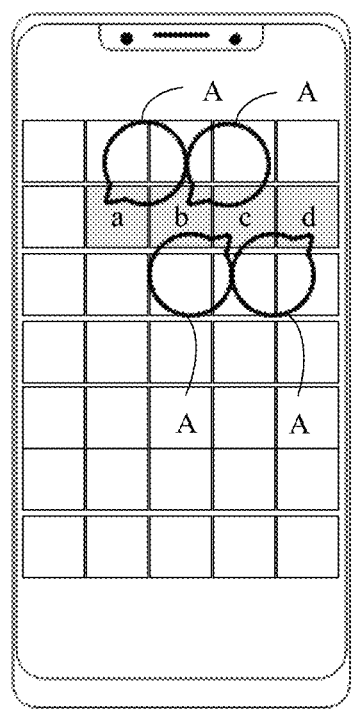
FIG. 11A is a first schematic diagram of an operation of reducing display of a magnified image of a plurality of target thumbnails according to an embodiment of the present disclosure.
Figure 11B:
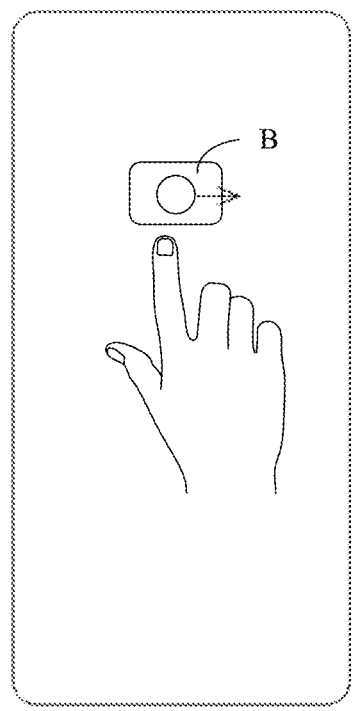
FIG. 11B is a second schematic diagram of an operation of reducing display of a magnified image of a plurality of target thumbnails according to an embodiment of the present disclosure.
Figure 11C:
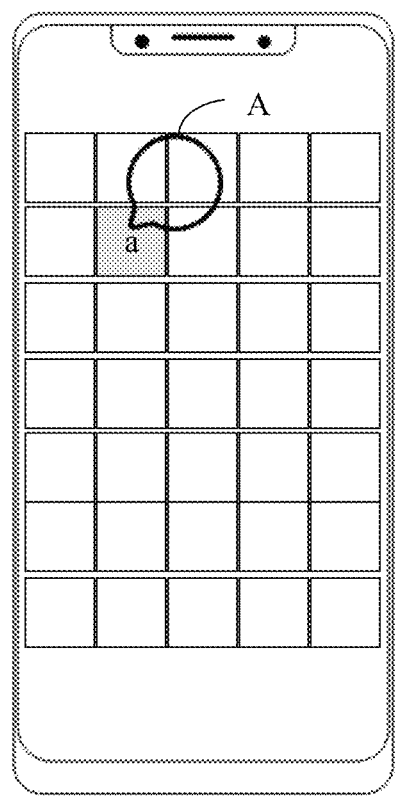
FIG. 11C is a third schematic diagram of an operation of reducing display of a magnified image of a plurality of target thumbnails according to an embodiment of the present disclosure.

In this example, T is greater than 1 and smaller than K. In FIG. 11A, before the terminal receives the second input, target thumbnails a, b, c, and d are already selected, and magnified images of the target thumbnails a, b, c, and d are displayed; in FIG. 11B, the terminal receives the second input for the fingerprint recognition area B on the rear side, the second input herein is an operation of circling and then sliding left, and duration T of the sliding left of the second input is 3; and in FIG. 11C, the terminal cancels the selection of the target thumbnails b, c, and d in response to the second input, and cancels the display of the magnified images of the thumbnails b, c, and d.

Example 3: The second input is a slide-down and slide-up operation. For example, the second input is an operation of quickly sliding down and then quickly sliding up for the fingerprint recognition area on the rear side. Selection of all thumbnails of the target thumbnails is canceled, and display of all magnified images of the thumbnails is canceled.

Figure 12A:
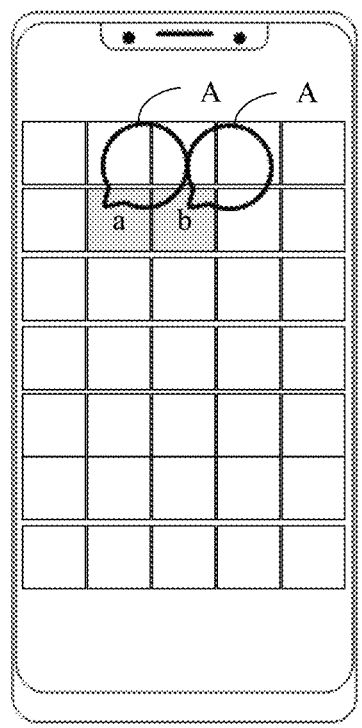
FIG. 12A is a first schematic diagram of an operation of reducing display of magnified images of all target thumbnails according to an embodiment of the present disclosure.
Figure 12B:
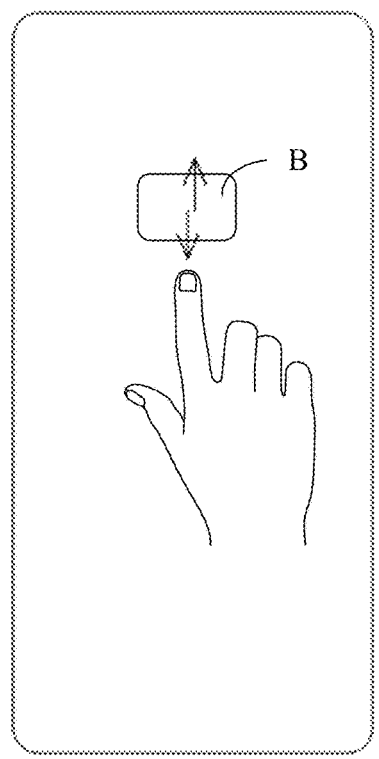
FIG. 12B is a second schematic diagram of an operation of reducing display of magnified images of all target thumbnails according to an embodiment of the present disclosure.
Figure 12C:
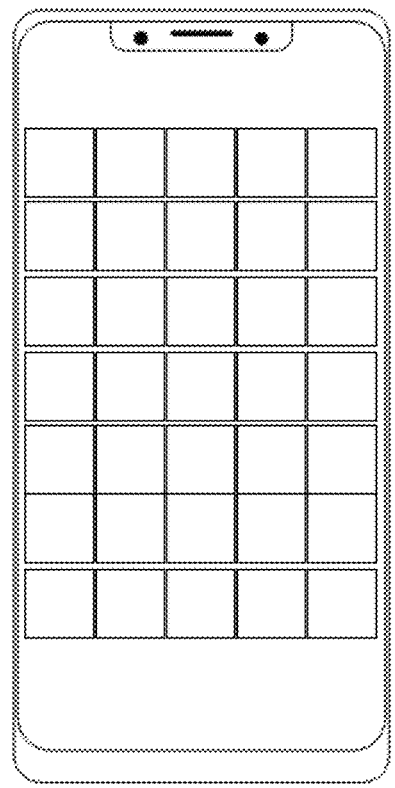
FIG. 12C is a third schematic diagram of an operation of reducing display of magnified images of all target thumbnails according to an embodiment of the present disclosure.

In this example, T is equal to K. In FIG. 12A, before the terminal receives the second input, target thumbnails a and b are already selected, and magnified images of the target thumbnails a and b are displayed; in FIG. 12B, the terminal receives the second input for the fingerprint recognition area B on the rear side, and the second input herein is a slide-down and slide-up operation; and in FIG. 12C, the terminal cancels the selection of the thumbnails a and b in response to the second input, and cancels the display of the magnified images of the target thumbnails a and b.

Based on the foregoing implementation, a quantity of displayed magnified images can be quickly and conveniently adjusted, so that the image display manner is more flexible.

Figure 13:
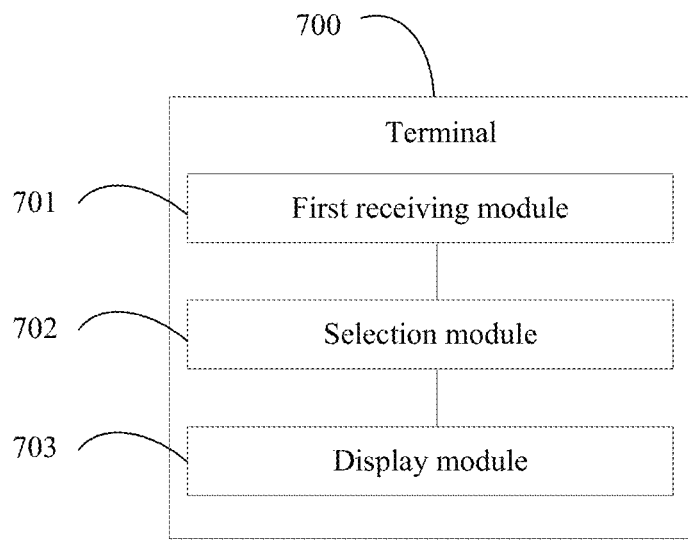
FIG. 13 is a structural diagram of a terminal according to an embodiment of the present disclosure.

FIG. 13 is a structural diagram of a terminal according to an embodiment of the present disclosure. As shown in FIG. 13, the terminal 700 includes:
  a first receiving module 701, configured to: in a case that at least two thumbnails are displayed on a first screen of the terminal, receive a first input performed by a user for a target area;
  a selection module 702, configured to select a target thumbnail from the at least two thumbnails in response to the first input; and
  a display module 703, configured to display a magnified image corresponding to the target thumbnail, where
  the target area is an area different from display areas of the at least two thumbnails.

Optionally, the display module 703 may be configured to:
  display a floating window at a target location corresponding to the target thumbnail, where the magnified image corresponding to the target thumbnail is displayed in the floating window.

Optionally, the target thumbnail is a thumbnail at a preset display location;
  the target thumbnail is a thumbnail having a preset image feature; or
  target thumbnail are M thumbnails whose image similarities are greater than a preset threshold, where M is an integer greater than 1.

Optionally, the selection module 702 may be configured to:
  obtain a currently selected first thumbnail from the at least two thumbnails; and
  select, from the at least two thumbnails, N thumbnails whose location relationships with the first thumbnail are a first location relationship as the target thumbnail, where N is a positive integer.

Optionally, the terminal 700 further includes:
  a first obtaining module, configured to obtain a first input feature of the first input; and
  a first determining module, configured to determine a quantity N of target thumbnails based on the first input feature.

Optionally, the terminal 700 further includes:
  a second obtaining module, configured to obtain a second input feature of the first input; and
  a second determining module, configured to determine a first location relationship associated with the second input feature, where
  the first location relationship includes at least one of the following:
  being at a same location as the first thumbnail;
  being on a first side of the first thumbnail;
  being adjacent to the first thumbnail; or
  being spaced from the first thumbnail by M thumbnails, where M is a positive integer.

Optionally, before the first receiving module receives the first input, a currently selected thumbnail is a second thumbnail, and a magnified image of the second thumbnail is displayed on the first screen.

The terminal 700 further includes:
  a canceling module, configured to cancel the selection of the second thumbnail, and cancel the display of the magnified image of the second thumbnail.

Optionally, the target thumbnail may include K thumbnails, and K is an integer greater than 1.

The terminal 700 further includes:
  a second receiving module, configured to receive a second input performed by the user for the target area;
  a third obtaining module, configured to obtain a third input feature of the second input; and
  a third determining module, configured to: determine T thumbnails of the K thumbnails based on the third input feature; and
  cancel the selection of the T thumbnails, and cancel display of magnified images of the T thumbnails, where T is a positive integer, and T≤K.

Optionally, the target area is a fingerprint recognition area;
  the target area is a touch button area; or
  in a case that the terminal includes a second screen, the target area is located in the second screen.

It should be noted that the terminal 700 in this embodiment of the present disclosure may be a terminal in any implementation in the method embodiments. Any implementation of the terminal in the method embodiments may be implemented by the terminal 700 in this embodiment of the present disclosure, and a same beneficial effect is achieved. To avoid repetition, details are not described herein again.

Figure 14:
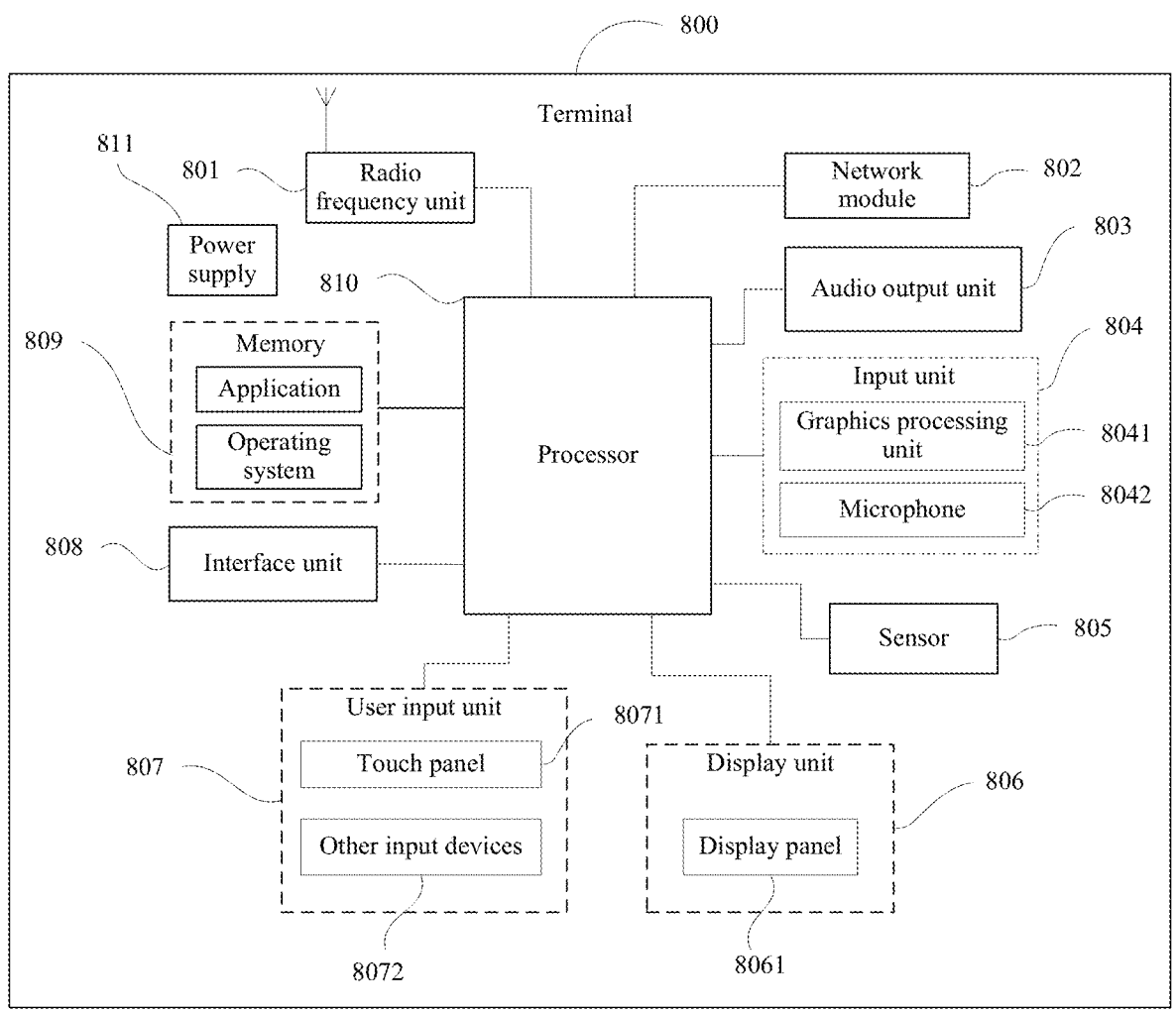
FIG. 14 is a schematic structural diagram of hardware of another terminal according to an embodiment of the present disclosure.

FIG. 14 is a schematic structural diagram of hardware of a terminal implementing the embodiments of the present disclosure. The terminal 800 has a foldable screen, and the terminal 800 includes but is not limited to: a radio frequency unit 801, a network module 802, an audio output unit 803, an input unit 804, a sensor 805, a display unit 806, a user input unit 807, an interface unit 808, a memory 809, a processor 810, a power supply 811, and other components. A person skilled in the art may understand that the structure of the terminal shown in FIG. 10 does not constitute a limitation on the terminal, and the terminal may include more or fewer components than those shown in the figure, or combine some components, or have different component arrangements. In this embodiment of the present disclosure, the terminal includes but is not limited to a mobile phone, a tablet computer, a laptop computer, a palmtop computer, a vehicle-mounted terminal, a wearable device, a pedometer, and the like.

The user input unit 807 is configured to: in a case that at least two thumbnails are displayed on a first screen of the terminal, receive a first input performed by a user for a target area, where the target area is an area different from display areas of the at least two thumbnails.

The processor 810 is configured to select a target thumbnail from the at least two thumbnails in response to the first input.

The display unit 806 is configured to display a magnified image corresponding to the target thumbnail.

Optionally, the display unit 806 may be configured to:
display a floating window at a target location corresponding to the target thumbnail, where the magnified image corresponding to the target thumbnail is displayed in the floating window.

Optionally, the target thumbnail is a thumbnail at a preset display location;
the target thumbnail is a thumbnail having a preset image feature; or
the target thumbnails are M thumbnails whose image similarities are greater than a preset threshold, where M is an integer greater than 1.

Optionally, the processor 810 may be configured to:
obtain a currently selected first thumbnail from the at least two thumbnails; and
select, from the at least two thumbnails, N thumbnails whose location relationships with the first thumbnail are a first location relationship as the target thumbnail, where N is a positive integer.

Optionally, the processor 810 is further configured to:
obtain a first input feature of the first input; and
determine a quantity N of target thumbnails based on the first input feature.

Optionally, the processor 810 is further configured to:
obtain a second input feature of the first input; and
determine a first location relationship associated with the second input feature, where
the first location relationship includes at least one of the following:
being at a same location as the first thumbnail;
being on a first side of the first thumbnail;
being adjacent to the first thumbnail; or
being spaced from the first thumbnail by M thumbnails, where M is a positive integer.

Optionally, before the first input is received, a currently selected thumbnail is a second thumbnail, and a magnified image of the second thumbnail is displayed on the first screen.

The processor 810 is further configured to:
cancel the selection of the second thumbnail, and cancel the display of the magnified image of the second thumbnail.

Optionally, the target thumbnail may include K thumbnails, and K is an integer greater than 1.

The user input unit 807 is further configured to receive a second input performed by the user for the target area.

The processor 810 is further configured to:
obtain a third input feature of the second input;
determine T thumbnails of the K thumbnails based on the third input feature; and
cancel the selection of the T thumbnails, and cancel display of magnified images of the T thumbnails, where T is a positive integer, and T≤K.

Optionally, the target area is a fingerprint recognition area;
the target area is a touch button area; or
in a case that the terminal includes a second screen, the target area is located in the second screen.

In this embodiment of the present disclosure, a user's operation is received for an area different from an image display area, so that a thumbnail can be selected, and a magnified image of the selected thumbnail can be displayed. In this way, in a case that the user needs to view a magnified image of an image, the user does not need to perform related operations for the image display area. Therefore, in an operation process, the user can clearly and completely browse display content in the whole image display area, which improves a visual effect of the user in the operation process.

It should be understood that in this embodiment of the present disclosure, the radio frequency unit 801 may be configured to receive and transmit information, or receive and transmit signals during a call. For example, the radio frequency unit 801 receives downlink data from a base station, and transmits the downlink data to the processor 810 for processing; and in addition, transmits uplink data to the base station. Generally, the radio frequency unit 801 includes, but is not limited to, an antenna, at least one amplifier, a transceiver, a coupler, a low noise amplifier, and a duplexer, and the like. In addition, the radio frequency unit 801 may communicate with a network and another device through a wireless communications system.

The terminal provides a user with wireless broadband internet access by using the network module 802, for example, helping the user receive and send an email, browse a web page, and access streaming media.

The audio output unit 803 may convert audio data received by the radio frequency unit 801 or the network module 802 or stored in the memory 809 into an audio signal and output the audio signal as a sound. In addition, the audio output unit 803 may further provide an audio output (for example, a call signal received sound, or a message received sound) related to a specific function implemented by the terminal 800. The audio output unit 803 includes a loudspeaker, a buzzer, a receiver, and the like.

The input unit 804 is configured to receive audio or video signals. The input unit 804 may include a graphics processing unit (GPU) 8041 and a microphone 8042. The graphics processing unit 8041 processes image data of a static image or video obtained by an image capture apparatus (for example, a camera) in a video capture mode or an image capture mode. A processed image frame may be displayed on the display unit 806. The image frame processed by the graphics processing unit 8041 may be stored in the memory 809 (or another storage medium) or sent by using the radio frequency unit 801 or the network module 802. The microphone 8042 may receive sound and can process such sound into audio data. Processed audio data may be converted, in a telephone call mode, into a format that can be sent to a mobile communication base station via the radio frequency unit 801 for output.

The terminal 800 further includes at least one type of sensor 805, such as a light sensor, a motion sensor, and another sensor. The optional sensor includes an ambient light sensor and a proximity sensor. The ambient light sensor may adjust luminance of the display panel 8061 based on brightness of ambient light, and the proximity sensor may disable the display panel 8061 and backlight when the terminal 800 approaches an ear. As a type of motion sensor, an accelerometer sensor may detect values of accelerations in various directions (generally three axes), and may detect a value and a direction of gravity when the terminal stays still. The accelerometer sensor may be configured to recognize a terminal posture (for example, landscape/portrait screen switching, a related game, or magnetometer posture calibration), performs a vibration recognition related function (for example, a pedometer or a strike), and so on. The sensor 805 may further include a fingerprint sensor, a pressure sensor, an iris sensor, a molecular sensor, a gyroscope, a barometer, a hygrometer, a thermometer, an infrared sensor, and the like. Details are not described herein.

The display unit 806 is configured to display information entered by a user or information provided for a user. The display unit 806 may include a display panel 8061, and the display panel 8061 may be configured in a form of a liquid crystal display (LCD), an organic light-emitting diode (OLED), or the like.

The user input unit 807 may be configured to receive input digit or character information and generate key signal input related to user setting and function control of the terminal. The user input unit 807 includes a touch panel 8071 and another input device 8072. The touch panel 8071 is also referred to as a touchscreen, and may collect a touch operation performed by a user on or near the touch panel 8071 (such as an operation performed by a user on the touch panel 8071 or near the touch panel 8071 by using any proper object or accessory, such as a finger or a stylus). The touch panel 8071 may include two parts: a touch detection apparatus and a touch controller. The touch detection apparatus detects a touch position of the user, detects a signal brought by the touch operation, and transmits the signal to the touch controller. The touch controller receives touch information from the touch detection apparatus, converts the touch information into contact coordinates, sends the contact coordinates to the processor 810, and can receive and execute a command sent by the processor 810. In addition, the touch panel 8071 may be implemented as a resistive type, a capacitive type, an infrared type, a surface acoustic wave type, or the like. The user input unit 807 may further include other input devices 8072 in addition to the touch panel 8071. The other input devices 8072 may include but are not limited to a physical keyboard, a function button (such as a volume control button or a power on/off button), a trackball, a mouse, a joystick, and the like. Details are not described herein.

Optionally, the touch panel 8071 may cover the display panel 8061. When detecting the touch operation on or near the touch panel 8071, the touch panel 8071 transmits the touch operation to the processor 810 to determine a type of a touch event, and then the processor 810 provides corresponding visual output on the display panel 8061 based on the type of the touch event. In FIG. 10, the touch panel 8071 and the display panel 8061 are used as two independent components to implement input and output functions of the terminal. However, in some embodiments, the touch panel 8071 and the display panel 8061 may be integrated to implement the input and output functions of the terminal. This is not specifically limited herein.

The interface unit 808 is an interface connecting an external apparatus and the terminal 800. For example, the external apparatus may include a wired or wireless headphone port, an external power supply (or a battery charger) port, a wired or wireless data port, a storage card port, a port used to connect to an apparatus having an identity module, an audio input/output (I/O) port, a video I/O port, a headset jack, and the like. The interface unit 808 may be configured to receive input (for example, data information and power) from the external apparatus and transmit the received input to one or more elements in the terminal 800, or may be configured to transmit data between the terminal 800 and the external apparatus.

The memory 809 may be configured to store a software program as well as various types of data. The memory 809 may mainly include a program storage area and a data storage area. The program storage area may store an operating system, an application program required for at least one function (such as a sound play function and an image play function), and the like. The data storage area may store data created based on use of the mobile phone (such as audio data and a phone book), and the like. In addition, the memory 809 may include a high-speed random access memory, and may further include a non-volatile memory such as at least one magnetic disk storage device, a flash memory device, or another volatile solid-state storage device.

The processor 810 is a control center of the terminal, and is connected to all parts of the entire terminal by using various interfaces and lines, and performs various functions of the terminal and processes data by running or executing the software program and/or the module that are stored in the memory 809 and invoking the data stored in the memory 809, to implement overall monitoring on the terminal. The processor 810 can include one or more processing units. Optionally, the processor 810 can be integrated with an application processor and a modem processor. The application processor mainly processes the operating system, the user interface, applications, etc. The modem processor mainly processes wireless communication. It can be understood that alternatively, the modem processor may not be integrated into the processor 810.

The terminal 800 may further include the power supply 811 (such as a battery) that supplies power to each component. Optionally, the power supply 811 may be logically connected to the processor 810 by using a power management system, so as to implement functions such as charging, discharging, and power consumption management by using the power management system.

In addition, the terminal 800 includes some function modules that are not shown. Details are not described herein.

Optionally, an embodiment of the present disclosure further provides a terminal, including a processor 810, a memory 809, and a computer program that is stored in the memory 809 and executable on the processor 810. When the processor 810 executes the computer program, the foregoing processes of the image display method embodiment are implemented and a same technical effect can be achieved. To avoid repetition, details are not described herein again.

It should be noted that the foregoing terminal 800 in this embodiment of the present disclosure may be a terminal of any implementation in the method embodiment in the embodiments of the present disclosure, any implementation of the terminal in the method embodiment in the embodiments of the present disclosure can be implemented by the foregoing terminal 800 in this embodiment, and the same beneficial effects can be achieved. To avoid repetition, details are not described herein again.

The embodiments of the present disclosure further provide a non-transitory computer-readable storage medium. The non-transitory computer-readable storage medium stores a computer program, and when a processor executes the computer program, the processes of the foregoing embodiment corresponding to the terminal or the network side are implemented and the same technical effects can be achieved. To avoid repetition, details are not described herein again. The non-transitory computer-readable storage medium is, for example, a read-only memory (ROM), a random access memory (RAM), a magnetic disk, or an optical disc.

It should be noted that, in this specification, the terms "include", "comprise", or any of their variants are intended to cover a non-exclusive inclusion, so that a process, a method, an article, or an apparatus that includes a series of elements not only includes those elements but also includes other elements that are not expressly listed, or further includes elements inherent to such a process, method, article, or apparatus. In absence of more constraints, an element preceded by "includes a . . . " does not preclude the existence of other identical elements in the process, method, article, or apparatus that includes the element.

Based on the foregoing descriptions of the embodiments, a person skilled in the art may clearly understand that the method in the foregoing embodiment may be implemented by software in addition to a necessary universal hardware platform or by hardware only. In most circumstances, the former is a preferred implementation manner. Based on such an understanding, the technical solutions of the present disclosure essentially or the part contributing to the prior art may be implemented in a form of a software product. The computer software product is stored in a storage medium (such as a ROM/RAM, a hard disk, or an optical disc), and includes several instructions for instructing a terminal (which may be mobile phone, a computer, a server, an air conditioner, a network device, or the like) to perform the methods described in the embodiments of the present disclosure.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. An image display method, applied to a terminal and comprising:
    displaying at least five thumbnails on a first screen of the terminal;
    obtaining a selected first thumbnail from the at least five thumbnails;
    receiving a first input performed by a user for a target area of the terminal, wherein the target area is an area different from display areas of the at least five thumbnails, wherein the first thumbnail is selected before the first input is received;
    obtaining a first input feature of the first input, wherein the first input feature of the first input comprises an input trajectory;
    in response to obtaining the first input feature, determining a quantity of N thumbnails from the at least five thumbnails based on the first input feature, wherein N is greater than 1, and determining a first location relationship of the N thumbnails with the selected first thumbnail based on the first input feature, wherein the first location relationship comprises being spaced from the first thumbnail by M thumbnails, wherein M is a positive integer;
    in response to determining the first location relationship and the quantity of N thumbnails, selecting a plurality of target thumbnails of the N thumbnails whose image similarities are greater than a preset threshold with the selected first thumbnail at an equal interval from the first thumbnail, spaced from the first thumbnail by the M thumbnails, without selecting thumbnails of the N thumbnails that fall within the equal interval; and
    displaying a magnified image for each target thumbnail of the plurality of target thumbnails.

2. The method according to claim 1, wherein the displaying a magnified image for each target thumbnail comprises:
    displaying a floating window at a target location corresponding to each target thumbnail, wherein the magnified image for each target thumbnail is displayed in the floating window.

3. The method according to claim 1, wherein before the first input is received, a currently selected thumbnail is a second thumbnail, and a magnified image of the second thumbnail is displayed on the first screen; and
    after the receiving the first input performed by the user for the target area, the method further comprises:
    canceling the selection of the second thumbnail, and canceling the display of the magnified image of the second thumbnail.

4. The method according to claim 1, wherein the plurality of target thumbnails include K thumbnails, and K is an integer greater than 1; and
    after the displaying the magnified image for each target thumbnail, the method further comprises:
    receiving a second input performed by the user for the target area;
    obtaining a third input feature of the second input;
    determining T thumbnails of the K thumbnails based on the third input feature; and
    canceling the selection of the T thumbnails, and canceling display of magnified images of the T thumbnails, wherein T is a positive integer, and T≤K.

5. The method according to claim 1, wherein
    the target area is a fingerprint recognition area;
    the target area is a touch button area; or
    in a case that the terminal comprises a second screen, the target area is located in the second screen.

6. A terminal, comprising: a memory, a processor, and a computer program that is stored in the memory and executable on the processor, wherein the computer program, when executed by the processor, causes the terminal to perform:
    displaying at least five thumbnails on a first screen of the terminal;
    obtaining a selected first thumbnail from the at least five thumbnails;
    receiving a first input performed by a user for a target area of the terminal, wherein the target area is an area different from display areas of the at least five thumbnails, wherein the first thumbnail is selected before the first input is received;
    obtaining a first input feature of the first input, wherein the first input feature of the first input comprises an input trajectory;
    in response to obtaining the first input feature, determining a quantity of N thumbnails from the at least five thumbnails based on the first input feature, wherein N is greater than 1, and determining a first location relationship of the N thumbnails with the selected first thumbnail based on the first input feature, wherein the first location relationship comprises being spaced from the first thumbnail by M thumbnails, wherein M is a positive integer;
    in response to determining the first location relationship and the quantity of N thumbnails, selecting a plurality of target thumbnails of the N thumbnails whose image similarities are greater than a preset threshold with the selected first thumbnail at an equal interval from the first thumbnail, spaced from the first thumbnail by the M thumbnails, without selecting thumbnails of the N thumbnails that fall within the equal interval; and displaying a magnified image for each target thumbnail of the plurality of target thumbnails.

7. The terminal according to claim 6, wherein the computer program, when executed by the processor, causes the terminal to perform:

displaying a floating window at a target location corresponding to each target thumbnail, wherein the magnified image for each target thumbnail is displayed in the floating window.

8. The terminal according to claim 6, wherein before the first input is received, a currently selected thumbnail is a second thumbnail, and a magnified image of the second thumbnail is displayed on the first screen; and the computer program, when executed by the processor, causes the terminal further to perform:

canceling the selection of the second thumbnail, and canceling the display of the magnified image of the second thumbnail.

9. The terminal according to claim 6, wherein the plurality of target thumbnails include K thumbnails, and K is an integer greater than 1; and the computer program, when executed by the processor, causes the terminal further to perform:

receiving a second input performed by the user for the target area;

obtaining a third input feature of the second input;

determining T thumbnails of the K thumbnails based on the third input feature; and canceling the selection of the T thumbnails, and canceling display of magnified images of the T thumbnails, wherein T is a positive integer, and T≤K.

10. The terminal according to claim 6, wherein the target area is a fingerprint recognition area;

the target area is a touch button area; or in a case that the terminal comprises a second screen, the target area is located in the second screen.

11. A non-transitory computer-readable storage medium, wherein the non-transitory computer-readable storage medium stores a computer program, and the computer program, when executed by a processor of a terminal, causes the terminal to perform:

displaying at least five thumbnails on a first screen of the terminal;

obtaining a selected first thumbnail from the at least five thumbnails;

receiving a first input performed by a user for a target area of the terminal, wherein the target area is an area different from display areas of the at least five thumbnails, wherein the first thumbnail is selected before the first input is received;

obtaining a first input feature of the first input, wherein the first input feature of the first input comprises an input trajectory;

in response to obtaining the first input feature, determining a quantity of N thumbnails from the at least five thumbnails based on the first input feature, wherein N is greater than 1, and determining a first location relationship of the N thumbnails with the selected first thumbnail based on the first input feature, wherein the first location relationship comprises being spaced from the first thumbnail by M thumbnails, wherein M is a positive integer;

in response to determining the first location relationship and the quantity of N thumbnails, selecting a plurality of target thumbnails of the N thumbnails whose image similarities are greater than a preset threshold with the selected first thumbnail at an equal interval from the first thumbnail, spaced from the first thumbnail by the M thumbnails, without selecting thumbnails of the N thumbnails that fall within the equal interval; and displaying a magnified image for each target thumbnail of the plurality of target thumbnails.

\* \* \* \* \*